US012723165B2

(12) United States Patent
Tsunematsu et al.

(10) Patent No.: US 12,723,165 B2
(45) Date of Patent: Sep. 1, 2026

(54) ANTI-COUNTERFEIT INK COMPOSITION, ANTI-COUNTERFEIT INK, AND ANTI-COUNTERFEIT PRINTED PRODUCT

(71) Applicant: SUMITOMO METAL MINING CO., LTD., Tokyo (JP)

(72) Inventors: Hirofumi Tsunematsu, Kagoshima (JP); Takeshi Chonan, Kagoshima (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 895 days.

(21) Appl. No.: 17/595,944

(22) PCT Filed: May 25, 2020

(86) PCT No.: PCT/JP2020/020626
§ 371 (c)(1),
(2) Date: Nov. 30, 2021

(87) PCT Pub. No.: WO2020/246299
PCT Pub. Date: Dec. 10, 2020

(65) Prior Publication Data
US 2022/0228012 A1 Jul. 21, 2022

(30) Foreign Application Priority Data
Jun. 5, 2019 (JP) ................................ 2019-105630

(51) Int. Cl.
*C09D 11/101* (2014.01)
*B41M 3/14* (2006.01)
(Continued)

(52) U.S. Cl.
CPC ............. *C09D 11/101* (2013.01); *B41M 3/14* (2013.01); *C09D 11/037* (2013.01); *C09D 11/106* (2013.01)

(58) Field of Classification Search
CPC ...... B41M 3/14; C09D 11/037; C09D 11/101; C09D 11/106
See application file for complete search history.

(56) References Cited

U.S. PATENT DOCUMENTS 5,443,579 A 8/1995 Tanaka et al.
2011/0080451 A1* 4/2011 Radke .................... B41M 3/144 252/301.4 R (Continued)

FOREIGN PATENT DOCUMENTS

CN 103242708 A * 8/2013
EP 3078503 10/2016

(Continued)

OTHER PUBLICATIONS

Machine Translation of CN-103242708-A (Year: 2013).*

(Continued)

*Primary Examiner* — Sathavaram I Reddy
(74) *Attorney, Agent, or Firm* — IPUSA, PLLC

(57) ABSTRACT

The present invention provides an anti-counterfeit ink composition including organic-inorganic hybrid infrared absorbing particles, and either a dispersant or a surfactant, or both, wherein the organic-inorganic hybrid infrared absorbing particles include infrared absorbing particles and a coating resin that covers at least a part of a surface of the infrared absorbing particles.

8 Claims, 2 Drawing Sheets

(51) Int. Cl.
*C09D 11/037* (2014.01)
*C09D 11/106* (2014.01)

(56) References Cited

U.S. PATENT DOCUMENTS

| | | | | |
|---|---|---|---|---|
| 2020/0270464 | A1 | 8/2020 | Tsunematsu et al. | |
| 2020/0283586 | A1 | 9/2020 | Tsunematsu et al. | |
| 2021/0047518 | A1 * | 2/2021 | Tsunematsu | C08K 9/04 |

FOREIGN PATENT DOCUMENTS

| | | | | |
|---|---|---|---|---|
| JP | H04-320466 | | 11/1992 | |
| JP | H05-338388 | | 12/1993 | |
| JP | 2002-285061 | | 10/2002 | |
| JP | 2004-168842 | | 6/2004 | |
| JP | 2009-113431 | | 5/2009 | |
| JP | 2015-117353 | | 6/2015 | |
| JP | 2019-131727 | | 8/2019 | |
| JP | 2020-050690 | | 4/2020 | |
| WO | 2012/103578 | | 8/2012 | |
| WO | 2016/121801 | | 8/2016 | |
| WO | WO-2016121801 | A1 * | 8/2016 | B42D 25/382 |
| WO | WO-2016121842 | A1 * | 8/2016 | B41M 3/14 |
| WO | 2019/021992 | | 1/2019 | |
| WO | 2019/022003 | | 1/2019 | |
| WO | 2019/093524 | | 5/2019 | |
| WO | WO-2019093524 | A1 * | 5/2019 | C01G 41/00 |

OTHER PUBLICATIONS

Machine Translation of WO-2016121801-A1 (Year: 2016).*
Machine Translation of WO-2016121842-A1 (Year: 2016).*
Machine Translation of JP 2019-131727A (Year: 2019).*
International Search Report mailed on Jul. 28, 2020 with respect to No. PCT/JP2020/020626.
SOLSPERSE(TM) 20000, MSDS dated Wednesday, Apr. 11, 2012 [retrieved from internet on Aug. 18, 2025] <URL: https://safety365.sevron.co.uk/substances/accessSDS/SDS-70543-58be72e77d4fe3.35431734> published on Apr. 11, 2012.

* cited by examiner

ANTI-COUNTERFEIT INK COMPOSITION, ANTI-COUNTERFEIT INK, AND ANTI-COUNTERFEIT PRINTED PRODUCT

TECHNICAL FIELD

The present invention relates to an anti-counterfeit ink composition, an anti-counterfeit ink, and an anti-counterfeit printed product.

DESCRIPTION OF RELATED ART

Conventionally, for valuable printed products such as bankbooks of deposits and savings, identification cards, credit cards, cash cards, checks, air tickets, road pass tickets, tickets, prepaid cards, gift certificates, and securities, or the like, special efforts have been made on the substrate and the printing method as a method for preventing counterfeiting. For example, special printing in which a watermark is placed on a substrate (see Patent Document 1), printing of a fine pattern (see Patent Document 2), digital processing using geometric shape printing typified by a bar code, and the like are performed.

For example, latent image printing (see Patent Document 1) and digital processing and the like using geometric shape printing represented by barcodes are being used. However, barcode printing can be easily counterfeited by copying or the like. In addition, latent image printing is not generally effective in preventing counterfeiting because of the added ambiguity of confirmation by the human eye.

As an anti-counterfeit method other than the above, a method for detecting the authenticity of printed products has been proposed using printing ink that absorbs less visible light in the wavelength range of 300 to 780 nm and absorbs near-infrared light in the wavelength range of 800 to 2400 nm. For example, for printed products that are printed with ink mixed with binder resin and near-infrared absorbing material with less absorption in the visible light range, when the printed surface is irradiated with an infrared laser, only the specific wavelength is absorbed, so the reflected or transmitted light can be read to determine authenticity.

Anti-counterfeit ink using a phthalocyanine compound has been proposed as such a printing ink that absorbs near-infrared rays (see Patent Document 2). However, the phthalocyanine compounds, which are near-infrared absorbing materials, have a disadvantage that they are inferior in weather resistance because their absorption properties are reduced by an influence of temperature, ultraviolet rays, and the like.

Meanwhile, a dispersion film containing hexaboride fine particles such as Y and La, ruthenium oxide fine particles and the like is known as a solar radiation absorbing film for insulating near-infrared rays of sunlight, and an idea of applying this film to an anti-counterfeit ink has been proposed (see Patent Document 3). However, when the solar radiation absorbing film is applied to the anti-counterfeit ink, a contrast of absorption of light with respect to transmission or reflection of light is not sufficient in a wavelength region that transmits or reflects light, and a wavelength region that absorbs light when used for coating, and therefore a reading precision and the like when used as the anti-counterfeit ink is sometimes deteriorated depending on the application.

Therefore, the present applicant discloses an anti-counterfeit ink containing composite tungsten oxide fine particles having a high contrast between the absorption in the near infrared region, and transmission or reflection in the visible light region, and excellent in weather resistance as compared with conventional materials (see Patent Document 4).

PRIOR ART DOCUMENT

Patent Document

[Patent Document 1] Japanese Unexamined Patent Application Publication No. Hei 05-338388

[Patent Document 3] Japanese Unexamined Patent Application Publication No. Hei 04-320466

[Patent Document 3] Japanese Patent Application Laid-Open No. 2004-168842

[Patent Document 4] Japanese Patent Application Laid-Open No. 2015-117353

SUMMARY OF THE INVENTION

Problem to be Solved by the Invention

However, the inventors of the present invention found that the infrared absorption properties of the infrared absorbing particles described in Patent Document 4 are not sufficiently resistant to chemicals, and therefore, when the anti-counterfeit inks and printed products for anti-counterfeit are exposed to a chemical environment such as high temperature acid or alkali, the infrared absorption properties deteriorate.

The present invention was performed in consideration of these conventional circumstances. In one aspect of the present invention, the object of the present invention is to provide an anti-counterfeit ink composition with chemical-resistant properties.

Means to Solve the Problems

One aspect of the present invention provides an anti-counterfeit ink composition including organic-inorganic hybrid infrared absorbing particles, and either a dispersant or a surfactant, or both, wherein the organic-inorganic hybrid infrared absorbing particles include infrared absorbing particles and a coating resin that covers at least a part of a surface of the infrared absorbing particles.

Effect of the Invention

In one aspect of the present invention, the present invention is to provide an anti-counterfeit ink composition with chemical-resistant properties.

DETAILED DESCRIPTION OF THE INVENTION

[Anti-Counterfeit Ink Composition]

Figure 1:
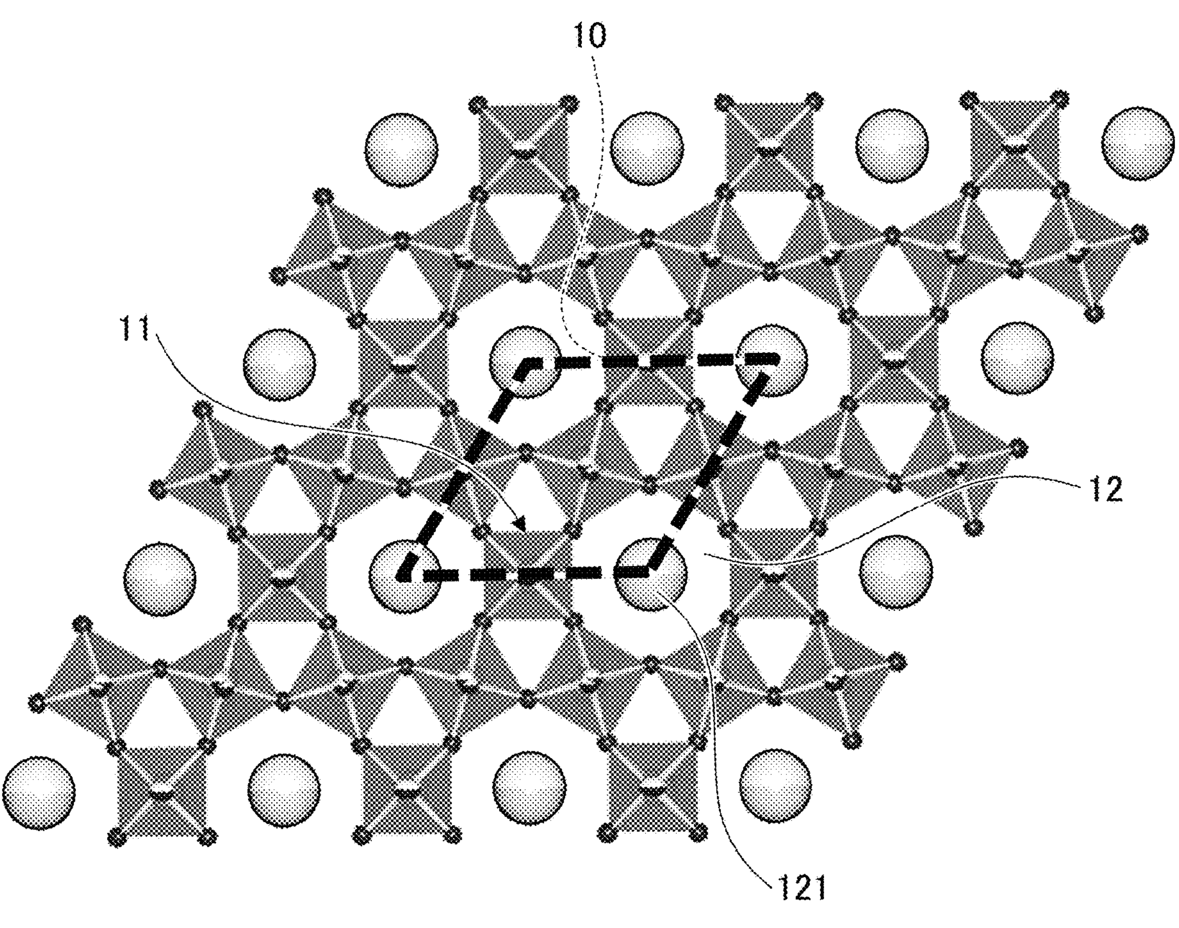
FIG. 1 illustrates a schematic diagram of the crystal structure of a composite tungsten oxide with a hexagonal crystal.

As mentioned above, the infrared absorbing particles disclosed in Patent Document 4 or the like did not have sufficient chemical-resistant properties. Therefore, the inventors of the present invention intensively studied a method of forming infrared absorbing particles with chemical-resistant properties. As a result, the inventors found that placing organic materials such as a resin directly on at least part of the surface of the infrared absorbing particles to form organic-inorganic hybrid infrared absorbing particles can exert chemical-resistant properties. Furthermore, the inventors found that the organic-inorganic hybrid infrared absorbing particles can be used to form an anti-counterfeit ink composition with chemical-resistant properties.

However, infrared absorbing particles are usually inorganic materials, and it has been difficult to place organic materials such as a resin or the like on at least part of particle surfaces. For this reason, organic-inorganic hybrid infrared absorbing particles and the methods of producing organic-inorganic hybrid infrared absorbing particles were not known. Therefore, the inventors of the present invention conducted further studies and found organic-inorganic hybrid infrared absorbing particles with organic materials on the surface of the infrared absorbing particles and a method of producing organic-inorganic hybrid infrared absorbing particles with organic materials on the surface of the infrared absorbing particles.

Therefore, the method of producing organic-inorganic hybrid infrared absorbing particles and the organic-inorganic hybrid infrared absorbing particles are explained.

1. The Method of Producing Organic-Inorganic Hybrid Infrared Absorbing Particles The anti-counterfeit ink composition of the present embodiment can contain organic-inorganic hybrid infrared absorbing particles as described above. The method of producing organic-inorganic hybrid infrared absorbing particles, for example, can include the following steps.

A step of preparing a dispersion solution includes preparing a dispersion solution containing infrared absorbing particles, a dispersant, and a dispersion medium.

A step of reducing the amount of the dispersion medium includes reducing the amount of the dispersion medium from the dispersion solution by evaporating the dispersion medium.

A step of preparing a raw material mixture includes preparing by mixing a raw material mixture containing the infrared absorbing particles collected after the step of reducing the amount of the dispersion medium, a resin material for coating, an organic solvent, an emulsifier, water, and a polymerization initiator.

A stirring step of the raw material mixture includes stirring the raw material mixture while cooling.

A polymerization step includes deoxygenizing the raw material mixture which reduces the amount of oxygen in the raw material mixture, followed by polymerizing the resin material for coating.

Hereinafter, each step will be explained.

(1) Step of Preparing Dispersion Solution

A step of preparing a dispersion solution includes preparing a dispersion solution containing infrared absorbing particles, a dispersant, and a dispersion medium.

Each material that can be suitably used to prepare the dispersion solution in the step of preparing a dispersion solution is described below.

(a) Infrared Absorbing Particles

In the step of preparing a dispersion solution, various types of infrared absorbing particles can be used, which are required to enhance the chemical-resistant properties, for example, acid resistance and alkali resistance. As the infrared absorbing particles, for example, infrared absorbing particles containing various materials that contain free electrons can be preferably used, and infrared absorbing particles containing various inorganic materials that contain free electrons can be more preferably used.

As infrared absorbing particles, infrared absorbing particles containing one or more types selected from an oxygen-deficient tungsten oxide and a composite tungsten oxide can be particularly preferably used. In this case, particularly, the infrared absorbing particles, for example, preferably contain one or more types selected from the tungsten oxide represented by a general formula $W_yO_z$ (W: tungsten, O: oxygen, $2.2 \leq z/y \leq 2.999$) and the composite tungsten oxide represented by a general formula $M_xW_yO_z$ (an element M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, $0.001 \leq x/y \leq 1$, $2.0 \leq z/y \leq 3.0$).

In general, it is known that materials containing free electrons exhibit a reflective absorption response to electromagnetic waves around the region of sunlight with wavelengths from 200 nm to 2600 nm due to plasma oscillations. For this reason, various materials containing free electrons can be suitably used as infrared absorbing particles. Infrared absorbing particles, for example, are to be smaller than the wavelength of light, because the smaller particles can reduce geometric scattering in the visible light range (wavelengths of 380 nm to 780 nm) and provide particularly high transparency in the visible light range.

In the present specification, "transparency" is used in the sense of "low scattering and high transmittance for light in the visible light range".

In general, free electrons are not present in the tungsten oxide ($WO_3$). Therefore, the tungsten oxide has less absorption and reflection characteristics in the infrared region and is not effective as infrared absorption particles.

In contrast, the oxygen-deficient $WO_3$ or the composite tungsten oxide with positive elements such as Na added to $WO_3$ are conductive materials and are known as materials having free electrons. The response of free electrons to light in the infrared region has been suggested by analysis of single crystals or the like of materials having these free electrons.

According to the analysis by the inventor of the present invention, in the specific part of the composition range of the tungsten and oxygen, there is a range that is particularly effective as an infrared absorption material, and the tungsten oxide or the composite tungsten oxide that is transparent in the visible light region and has particularly strong absorption in the infrared region can be formed.

Therefore, the tungsten oxide and the composite tungsten oxide, which are a type of material of infrared absorbing particles that can be suitably used in the step of preparing a dispersion solution, are further explained below.

(a1) Tungsten Oxide

The tungsten oxide is represented by a general formula $W_yO_z$ (where W is tungsten and O is oxygen, $2.2 \leq z/y \leq 2.999$).

In the composition range of the tungsten and oxygen in the tungsten oxide represented by the general formula $W_yO_z$, the composition ratio (z/y) of oxygen to tungsten is preferably less than 3 and more preferably $2.2 \leq z/y \leq 2.999$. In particular, the composition ratio is particularly preferably $2.45 \leq z/y \leq 2.999$.

If the above value of z/y is 2.2 or more, the infrared absorbing particles are particularly effective because appearance of an undesired $WO_2$ crystalline phase in the tungsten oxide can be avoided from being formed and chemical stability as a material can also be obtained.

In addition, if the above value of z/y is preferably less than 3 and more preferably 2.999 or less, a sufficient number of free electrons can be generated to enhance the absorption and reflection characteristics in the infrared region, resulting in forming more efficient infrared absorbing particles.

In addition, a so-called "Magnelli phase", which has the composition ratio of $2.45 \le z/y \le 2.999$, is chemically stable and has excellent absorption properties of light in the near-infrared region, so that the tungsten oxide can be used more preferably as an infrared absorbing material. Therefore, the composition ratio z/y is even more preferably $2.45 \le z/y \le 2.999$, as mentioned above.

(a2) Composite Tungsten Oxide

The composite tungsten oxide is formed by adding the element M described below to the $WO_3$ as described above.

By adding the element M to form the composite tungsten oxide, free electrons are generated in $WO_3$, and a strong absorption property derived from free electrons appears especially in the near-infrared region. Such $WO_3$ becomes effective as near-infrared absorbing particles around 1000 nm in wavelength.

In other words, the composite tungsten oxide with a combination of controlling the amount of oxygen and adding the element M that generates free electrons to the $WO_3$ can exhibit more efficient infrared absorption properties. When the general formula of the composite tungsten oxide with a combination of controlling the amount of oxygen and adding the element M that generates free electrons to the $WO_3$ is represented by $M_xW_yO_z$, the composition ratios preferably satisfy the relationship of $0.001 \le x/y \le 1$ and $2.0 \le z/y \le 3.0$. The M in the above general formula indicates the previously mentioned element M, and W and O indicate tungsten and oxygen, respectively.

When the value of x/y, which indicates the additive amount of the element M, is 0.001 or more as described above, a particularly sufficient number of free electrons is generated in the composite tungsten oxide, and a high infrared absorption effect can be obtained. The higher the additive amount of the element M, the more free electrons are supplied, and the infrared absorption efficiency increases, but the effect is saturated when the value of x/y is about 1. When the value of x/y is 1 or less, the formation of impurity phases in the infrared absorbing particles containing the composite tungsten oxide can be avoided from being formed.

The element M is preferably one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I.

In view of particularly enhancing the high stability in $M_xW_yO_z$, the element M is preferably one or more elements selected from alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re. From the viewpoint of improving the optical properties and weather resistance as infrared absorbing particles containing the composite tungsten oxide, the element M is even more preferably one or more elements selected from alkali metal elements, alkaline earth metal elements, transition metal elements, group 4B elements, and group 5B elements.

For the value of z/y, which indicates the additive amount of oxygen, the same mechanism works in the composite tungsten oxides represented by $M_xW_yO_z$ as in the tungsten oxides represented by $W_yO_z$ above. In addition, the supply of free electrons due to the additive amount of the element M as described above also applies to the value of z/y of 3.0. Therefore, the ratio z/y is preferably $2.0 \le z/y \le 3.0$, more preferably $2.2 \le z/y \le 3.0$, and even more preferably $2.45 \le z/y \le 3.0$.

Furthermore, when the composite tungsten oxide has a hexagonal crystal structure, the transmission of light in the visible light region of the infrared absorbing particles containing the composite tungsten oxide is improved, and the absorption of light in the infrared region is improved. This will be explained with reference to FIG. 1, which is a schematic plan view of the hexagonal crystal structure.

FIG. 1 illustrates a projection view of the crystal structure of a composite tungsten oxide with a hexagonal structure viewed from the (001) direction. The unit lattice 10 is indicated by the dotted line.

In FIG. 1, six octahedra 11 formed by $WO_6$ units are assembled to form a hexagonal void 12, and an element 121, which is an element M, is placed in the void 12 to form a single unit, and many of these single units are assembled to form a hexagonal crystal structure.

In order to improve the transmittance of light in the visible light region and to improve the absorption of light in the infrared region, the composite tungsten oxide may contain the unit structure described in FIG. 1, and the composite tungsten oxide may be crystalline or amorphous.

When the cations of element M are added and present in the hexagonal voids as described above, the transmission of light in the visible light region is improved and the absorption of light in the infrared region is improved. In general, the hexagonal crystal is easily formed when an element M with a large ionic radius is added. Specifically, when one or more elements selected from Cs, K, Rb, Tl, In, Ba, Li, Ca, Sr, Fe, and Sn are added as the element M, hexagonal crystals are easily formed. Elements other than these elements can also be used, as long as the above-mentioned element M is present in the hexagonal voids formed by $WO_6$ units, and are not limited to the above-mentioned elements.

The composite tungsten oxide with a hexagonal crystal structure has a uniform crystal structure. The additive amount of element M is preferably 0.2 or more and 0.5 or less in terms of the value of x/y in the general formula mentioned above, and is more preferably 0.33. If the value of x/y is 0.33, the above-mentioned element M is considered to be placed in all of the hexagonal voids.

Alternatively, other than the infrared-absorbing particles including composite tungsten oxide with hexagonal crystal structure, infrared-absorbing particles including composite tungsten oxides with tetragonal crystal structure and cubic crystal structure also exert sufficiently effective infrared absorption properties. Depending on the crystal structure, the absorption position in the infrared region tends to change. In the order of cubic<tetragonal<hexagonal, the absorption position tends to move to the long wavelength side. In addition, less absorption of light in the visible light range associated with the above is the order of hexagonal, tetragonal, and cubic crystals. Therefore, for applications that transmit more light in the visible light region and shield more light in the infrared region, hexagonal composite tungsten oxide is preferably used. The tendency in optical properties described here is only a general. The tendency of the optical properties varies depending on the type of element added, the amount added, and the amount of oxygen. The invention is not limited to these.

The infrared-absorbing particles containing tungsten oxides or composite tungsten oxides greatly absorb light in the near-infrared region especially around the wavelength of 1000 nm. Therefore, many of the transmissive color tones are of a blue to green color tone.

The dispersed particle size of the infrared absorbing particles can be selected according to their intended use.

First, the infrared absorbing particles with 800 nm or less in the dispersed particle size are preferably used when the particles are used to maintain the transparency. This is because particles with a dispersed particle size of 800 nm or less do not completely block light due to scattering, and can retain visibility in the visible light range, while at the same time efficiently retaining transparency. When transparency in the visible light range is particularly important, it is preferable to further consider the reduction of scattering by particles.

When the reduction of scattering by particles is important, the dispersed particle size is preferably 200 nm or less and more preferably 100 nm or less. This is because if the dispersed particle size is small, scattering of light in the visible light range between 400 nm and 780 nm due to geometric scattering or Mie scattering is reduced. As a result, for example, an infrared absorbing film with dispersed infrared absorbing particles becomes like frosted glass, and clear transparency cannot be obtained. This is because, for example, an infrared absorbing film with dispersed infrared absorbing particles can be avoided from becoming cloudy like a cloudy glass and becoming less transparent. In other words, when the dispersed particle size is 200 nm or less, the above geometric scattering or Mie scattering is reduced, and the Rayleigh scattering region is reached. In the Rayleigh scattering region, the scattered light is reduced in proportion to the sixth power of the particle size, so the scattering is reduced as the dispersed particle size is reduced, and transparency is improved.

Furthermore, when the dispersed particle size is 100 nm or less, the scattered light becomes less, which is desirable. From the viewpoint of avoiding light scattering, the smaller the dispersed particle size, the more desirable it is.

The lower limit of the dispersed particle size of the infrared absorbing particles is not limited, but the dispersed particle size is preferably 1 nm or more, for example, because such particle size is easily manufactured industrially.

When the dispersed particle size of the infrared absorbing particles is set to 800 nm or less, the haze value of the dispersed infrared absorbing particles in the medium can be set to 30% or less with a visible light transmittance of 85% or less. When the haze is set to 30% or less, it is possible to prevent the infrared absorbing particle dispersion from becoming like cloudy glass to obtain particularly clear transparency.

The dispersed particle size of the infrared absorbing particles can be measured using the ELS-8000 manufactured by Otsuka Electronics Co., Ltd. or other instruments based on the principle of dynamic light scattering.

From the viewpoint of demonstrating excellent infrared absorption properties, the crystallite size of the infrared absorbing particles is preferably 1 nm or more and 200 nm or less, more preferably 1 nm or more and 100 nm or less, and even more preferably 10 nm or more and 70 nm or less. The crystallite size can be measured by measuring the X-ray diffraction pattern using the powder X-ray diffraction method ($\theta$-2$\theta$ method) and analysis using the Rietveld method. The X-ray diffraction pattern can be measured using, for example, the powder X-ray diffractometer "X'Pert-PRO/MPD" manufactured by PANalytical, manufactured by Spectris Co., Ltd.

(b) Dispersant

Dispersants are used to treat the surface of the infrared absorbing particles to make the surface of the infrared absorbing particles hydrophobic. The dispersant can be selected according to the dispersion system, which is a combination of infrared absorbing particles, dispersion medium, and raw materials of a coating resin. Among them, dispersants having one or more functional groups selected from amino groups, hydroxyl groups, carboxyl groups, sulfo groups, phosphate groups, and epoxy groups can be suitably used. When the infrared-absorbing particles are tungsten oxides or composite tungsten oxides, the dispersant preferably has an amino group as a functional group.

The dispersant preferably has an amino group as a functional group as described above, that is, preferably an amine compound. Furthermore, the amine compound is more preferably a tertiary amine.

The dispersant is preferably a polymeric material because the dispersant is used for the purpose of hydrophobizing the surface of the infrared absorbing particles. For this reason, a dispersant having one or more types selected from long-chain alkyl groups and benzene rings is preferably used. A polymer dispersant or the like having a copolymer of styrene and 2-(dimethylamino) ethyl methacrylate, which is a tertiary amine, which can be used as a raw material of a coating resin in the side chain, can be more preferably used. The long-chain alkyl group preferably has a carbon number of 8 or more. For example, a dispersant that is a polymer material and an amine compound can be used.

The additive amount of dispersant is not particularly limited, and can be selected according to the purpose. The suitable amount of dispersant can be selected according to the type of dispersant and infrared absorbing particles and the specific surface area of the infrared absorbing particles. For example, if the amount of dispersant added is 10 parts by mass or more and 500 parts by mass or less with respect to 100 parts by mass of the infrared absorbing particles, a dispersant liquid which is in a particularly favorable dispersed state can be preferably prepared. The additive amount of dispersant is more preferably 10 parts by mass or more and 100 parts by mass or less, and even more preferably 20 parts by mass or more and 50 parts by mass or less.

(c) Dispersion Medium

The dispersion medium can be any dispersion media that can disperse the infrared absorbing particles and dispersants to prepare a dispersion solution. For example, various organic compounds can be used.

As the dispersion medium, for example, one or more selected from aromatic hydrocarbons such as toluene and xylene can be preferably used.

In the step of preparing a dispersion solution, the dispersion solution can be prepared by mixing the infrared absorbing particles, the dispersant, and the dispersion medium. The dispersion particle size of the infrared absorbing particles is reduced to make the dispersion solution uniform. In order to disperse the particles, it is preferable to pulverize the infrared absorbing particles at the time of mixing.

The mixing methods used for mixing and grinding the infrared absorbing particles, a dispersant, and a dispersion medium are not particularly limited, but one or more types selected from bead mills, ball mills, sand mills, paint shakers, ultrasonic homogenizers, and the like can be preferably used. In particular, media stirring mills such as bead mills, ball mills, sand mills, paint shakers, and the like that use media such as beads, balls, and Ottawa sand can be preferably used. This is because the use of a media stirring mill enables the desired dispersed particle size to be achieved in a particularly short time for infrared absorbing particles, which is desirable from the perspective of productivity and control of impurities.

(2) Step of Reducing Dispersion Medium

In the step of reducing the dispersion medium, the dispersion medium can be evaporated and dried from the dispersion solution.

In the step of reducing the dispersion medium, the infrared absorbing particles are preferably recovered by evaporating the dispersion medium from the dispersion solution.

The specific methods of evaporating the dispersion medium are not particularly limited, but for example, a dryer such as an oven, a vacuum fluid dryer such as an evaporator or vacuum grinder, or a spray dryer such as a spray drying device can be used.

The degree to which the dispersion medium is evaporated is also not particularly limited, but it is preferable that the percentage of the dispersion medium can be reduced so that the powdered infrared absorbing particles are obtained after the dispersion medium reduction step.

By evaporating the dispersion medium, the dispersant is placed around the infrared absorbing particles to obtain infrared absorbing particles with a hydrophobized surface. Therefore, the adhesion between the hydrophobized infrared absorbing particles and the coating resin, which is polymerized from the raw material for the coating resin, can be increased, and placing the coating resin on at least part of the surface of the infrared absorbing particles by the polymerization step described below can be realized.

(3) Preparation Step of Raw Material Mixture

A step of preparing a raw material mixture includes preparing by mixing a raw material mixture containing the infrared absorbing particles collected after the step of reducing the amount of the dispersion medium, a resin material for coating, an organic solvent, an emulsifier, water, and a polymerization initiator.

The infrared absorbing particles collected after the step of reducing the dispersion medium may have the dispersant supplied in the step of preparing the dispersion solution attached to the surface of the particles, resulting in dispersant-containing infrared absorbing particles. Therefore, when the dispersant is attached to the infrared absorbing particles, the dispersant-containing infrared absorbing particles recovered after the step of reducing the dispersion medium are used as the infrared absorbing particles in the raw material mixture preparation step.

Hereinafter, each material other than the infrared absorbing particles used in the step of preparing the raw material mixture is explained.

(a) Resin Material for Coating

The resin material for coating is polymerized in the polymerization step described below to become the coating resin that is placed on at least part of the surface of the infrared absorbing particles. For this reason, various monomers that can form the desired coating resin by polymerization can be selected as the resin material for coating.

The coating resin after polymerization is not particularly limited, and for example, one or more kinds of resins selected from a thermoplastic resin, a thermosetting resin, a photocurable resin, and the like can be used.

Examples of the thermoplastic resins include polyester resin, polycarbonate resin, acrylic resin, polystyrene resin, polyamide resin, vinyl chloride resin, olefin resin, fluorine resin, polyvinyl acetate resin, thermoplastic polyurethane resin, acrylonitrile butadiene styrene resin, and polyvinyl acetal resin, acrylonitrile-styrene copolymer resin, ethylene-vinyl acetate copolymer resin, and the like.

Examples of the thermosetting resins include phenol resin, epoxy resin, melamine resin, urea resin, unsaturated polyester resin, alkyd resin, thermosetting polyurethane resin, polyimide resin, silicone resin, and the like.

Examples of the photocurable resins include a resin to be cured by irradiation of any one of ultraviolet rays, visible rays, and near infrared rays.

Examples of resins for coating include at least one type of resins selected from polyester resin, polycarbonate resin, acrylic resin, polystyrene resin, polyamide resin, vinyl chloride resin, olefin resin, fluorine resin, polyvinyl acetate resin, polyurethane resin, acrylonitrile butadiene styrene resin, polyvinyl acetal resin, acrylonitrile-styrene copolymer resin, styrene-vinyl acetate copolymer resin, phenol resin, epoxy resin, melamine resin, urea resin, unsaturated polyester resin, alkyd resin, polyimide resin, and silicone resin. It should be noted that both thermoplastic polyurethane and thermosetting polyurethane can be used as the above polyurethane resin.

In addition, a photocurable resin can also be suitably used as a coating resin, and the photocurable resin can contain a resin to be cured by irradiation of any one of ultraviolet rays, visible rays, or infrared rays, as described above.

Among them, it is preferable that the coating resin be a resin to which the mini-emulsion polymerization method can be applied, for example, it is more preferable for a polystyrene resin to be included. When the coating resin is polystyrene, styrene can be used as the raw material for the coating resin.

Multi-functional vinyl monomers such as divinylbenzene and ethylene glycol dimethacrylate can also be added as cross-linking agents.

(b) Organic Solvents

Organic solvents are not particularly limited, but any non-aqueous soluble solvent can be used. Among them, organic solvents with low molecular weight are preferably used. For example, one or more types selected from long-chain alkyl compounds such as hexadecane and the like; alkyl esters of methacrylic acid with long alkyl portions such as dodecyl methacrylate and stearyl methacrylate, and the like; higher alcohols such as cetyl alcohol and the like; and oils such as olive oil and the like, can be included.

As an organic solvent, long-chain alkyl compounds are particularly preferably used, and hexadecane is even more preferably used.

(c) Emulsifiers

Emulsifiers, that is surfactants, are not particularly limited. Examples of the emulsifiers include cationic, anionic, nonionic, or the like.

Examples of the cationic emulsifiers include alkylamine salts, quaternary ammonium salts, and the like.

Examples of the anionic emulsifiers include acid salts, ester salts, and the like.

Examples of the nonionic emulsifiers include various esters, various ethers, various ester ethers, alkanolamides, and the like.

As an emulsifier, for example, one or more types selected from the materials as described above can be used.

Among them, a cationic emulsifier, that is a surfactant that exhibits cationic properties, is preferably used from the viewpoint that the infrared absorbing particles particularly easily form organic-inorganic hybrid infrared absorbing particles.

Especially when an amine compound is used as a dispersant, one or more cationic emulsifiers selected from dodecyltrimethylammonium chloride (DTAC), cetyltrimethylammonium chloride (CTAC), and the like can be preferably used. When amine compounds are used as dispersants, it may be difficult to form organic-inorganic hybrid infrared absorbing particles if sodium dodecyl sulfate (SDS), which is an anionic emulsifier, is used. When preparing the raw material mixture, the emulsifier can be added as an aqueous solution, for example, by simultaneously adding the emulsifier with water. In this case, the emulsifier is added as an aqueous solution adjusted to a concentration of 1 time or higher and 10 times of lower of the critical micelle concentration (CMC).

(d) Polymerization Initiator

Polymerization initiators are not particularly limited. As a polymerization initiator, one or more types selected from various types of polymerization initiators such as radical polymerization initiators, ionic polymerization initiators, and the like can be used.

As radical polymerization initiators, azo compounds, dihalogen, organic peroxides, and the like can be used. Redox initiators that combine oxidizing and reducing agents, such as hydrogen peroxide and iron (II) salts, persulfate and sodium hydrogen sulfite, and the like can also be used.

Nucleophiles, such as n-butyl lithium, and electrophiles, such as protic and Lewis acids, halogen molecules, carbocations, and the like can be used as ion polymerization initiators.

Examples of the polymerization initiators include 2,2'-azobisisobutyronitrile (AIBN), potassium peroxodisulfate (KPS), 2,2'-azobis(2-methylpropionamidine) dihydrochloride (V-50), 2,2'-azobis(2-methyl-N-(2-hydroxyethyl)propionamidine) (VA-086), and the like. One or more of these initiators can be suitably used.

When preparing the raw material mixture, the polymerization initiator can be added to the organic phase or the aqueous phase, depending on its type. For example, when 2,2'-azobisisobutyronitrile (AIBN) is used, AIBN can be added to the organic phase. When potassium peroxodisulfate (KPS) or 2,2'-azobis(2-methylpropionamidine) dihydrochloride (V-50) is used, KPS or V-50 can be added to the aqueous phase.

In the step of preparing a raw material mixture, a raw material mixture may be prepared by mixing the infrared absorbing particles collected after the step of reducing the amount of the dispersion medium, a resin material for coating, an organic solvent, an emulsifier, water, and a polymerization initiator. Accordingly, the preparation procedures and the like of the raw material mixture are not particularly limited, but a mixture containing emulsifier as an aqueous phase can be preliminarily prepared. Furthermore, a mixture of the raw materials of coating resin and the infrared absorbing particles collected after the step of reducing the dispersion medium that are dispersed in an organic solvent, as an organic phase, can be prepared.

It should be noted that the polymerization initiator can be added to the aqueous phase or organic phase depending on the type of polymerization initiator used as described above.

The raw material mixture can then be prepared by adding and mixing the organic phase to the aqueous phase.

After adding the organic phase into the aqueous phase, sufficient stirring is preferably performed so that the coating resin can be evenly arranged on the surface of the infrared absorbing particles. In other words, the step of preparing a raw material mixture further preferably includes a stirring step of stirring the resulting mixture in addition to the mixing step of mixing the infrared absorbing particles collected after the step of reducing the amount of the dispersion medium, a resin material for coating, an organic solvent, an emulsifier, water, and a polymerization initiator.

In the stirring step, for example, stirring can be carried out using a stirrer. When the stirring step is carried out, the degree of stirring is not particularly limited, but for example, it is preferable to carry out the stirring so that oil droplets in water are formed in which the infrared absorbing particles encapsulated in the resin material for coating are dispersed in the aqueous phase.

The amount of polymerization initiator added is not particularly limited and can be selected as desired. The amount of polymerization initiator added can be selected according to the type of coating resin material and polymerization initiator, the size of the oil droplets that are mini-emulsions, and the ratio of the resin material for coating to the infrared absorbing particles. For example, if the amount of polymerization initiator added is 0.01% by mol or more and 1,000% by mol or less with respect to the resin material for coating, it is preferable because it is easy to obtain organic-inorganic hybrid infrared absorbing particles in which the infrared absorbing particles are sufficiently covered with the coating resin. The amount of polymerization initiator added is more preferably 0.1% by mol or more and 200% by mol or less with respect to the raw material of coating resin, and even more preferably 0.2% by mol or more and 100% by mol or less.

(4) Stirring Step

In the stirring step, the raw material mixture obtained in the step of preparing the raw material mixture can be stirred while being cooled.

The degree of stirring in the stirring step is not particularly limited and can be selected as desired. For example, it is preferable to stir the mixture so that the size becomes oil droplets in water which is an O/W type emulsion in which the infrared absorbing particles encapsulated in the resin material for coating are dispersed in the aqueous phase, that is, the mixture becomes a mini-emulsion with the size of the oil droplets of 50 nm or more and 500 nm or less.

Mini-emulsions are obtained by adding a substance that is almost insoluble in water, that is, a hydrophobe, to an organic phase and applying a strong shearing force. The hydrophobe includes, for example, the organic solvents already mentioned in the step of preparing the raw material mixture. In addition, as a method of applying strong shearing force, for example, ultrasonic vibration is applied to the raw material mixture by a homogenizer.

In the stirring step, it is preferable to perform stirring while cooling the raw material mixture as described above. This is because by cooling the raw material mixture, a mini-emulsion can be formed while inhibiting the polymerization reaction from progressing.

The degree to which the raw material mixture is cooled is not particularly limited. Cooling is preferably conducted with use of a refrigerant at 0° C. or lower, for example, by means of an ice bath.

(5) Polymerization Step

In the polymerization step, after deoxygenation treatment to reduce the amount of oxygen in the raw material mixture, the polymerization reaction of the resin material for coating can be carried out.

In the polymerization step, the resin material for coating is polymerized, and the coating resin can be placed on at least part of the surface of the infrared absorbing particles.

Although the conditions in the polymerization step are not particularly limited, a deoxygenation process to reduce the amount of oxygen in the raw material mixture can be performed before starting the polymerization. Specific methods of deoxygenation process are not particularly limited, but include ultrasonic irradiation and blowing inert gas into the raw material mixture.

The specific conditions for carrying out the polymerization reaction are not particularly limited because the conditions can be selected arbitrarily according to the resin materials for coating and the like which are added to the raw material mixture. The conditions, for examples, include heating the raw material mixture and emitting light with a predetermined wavelength, thereby processing the polymerization reaction.

According to the method of manufacturing organic-inorganic hybrid infrared absorbing particles of the present embodiment as described above, organic materials such as resin can be placed on at least part of the surface of the infrared absorbing particles, which has been difficult in the conventional technique. Therefore, even when exposed to an environment of chemicals such as acids or alkalis at high temperatures, the infrared absorbing particles can be prevented from coming into direct contact with the chemical components such as acids or alkalis, resulting in excellent chemical-resistance and a reduction in the infrared absorption properties.

2. Organic-Inorganic Hybrid Infrared Absorbing Particles

The following explains organic-inorganic hybrid infrared absorbing particles. Organic-inorganic hybrid infrared absorbing particles can have infrared absorbing particles and a coating resin that covers at least part of the surface of the infrared absorbing particles. Organic-inorganic hybrid infrared absorbing particles can be produced, for example, by the method of producing organic-inorganic hybrid infrared absorbing particles already described. For this reason, some of the matters already explained will be omitted.

By placing a coating resin covering at least a part of the surface of the infrared absorbing particles, which was difficult in the conventional technique, the infrared absorbing particles can be prevented from coming into direct contact with chemical components such as acids or alkalis even when exposed to an environment of chemicals such as acids or alkalis at high temperatures. Therefore, according to the organic-inorganic hybrid infrared absorbing particles of the present embodiment, it is possible to have excellent chemical-resistant properties and to suppress the degradation of infrared absorption properties.

As detailed explanation of the infrared absorbing particles is already explained in the method of producing organic-inorganic hybrid infrared absorbing particles, detailed explanation of the infrared absorbing particles is omitted here. As an example of infrared absorbing particles, infrared absorbing particles containing various materials containing free electrons are preferably used, and infrared absorbing particles containing various inorganic materials containing free electrons are more preferably used.

Infrared absorbing particles containing one or more types selected from oxygen-deficient tungsten oxides and composite tungsten oxides can be particularly preferably used. In this case, in particular, the infrared absorbing particles preferably include one or more types selected from, for example, a tungsten oxide represented by a general formula $W_yO_z$ (W: tungsten, O: oxygen, $2.2 \leq z/y \leq 2.999$) and a composite tungsten oxide represented by a general formula $M_xW_yO_z$ (an element M is one or more kinds selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; $0.001 \leq x/y \leq 1$, $2.0 \leq z/y \leq 3.0$)

The detailed explanation of coating resin is also omitted here because the coating resin has already been described in the method of producing organic-inorganic hybrid infrared absorbing particles. Examples of resins for coating can be one or more types of resin selected from, for example, thermoplastic resins, thermosetting resins, and photocurable resins. Examples of the resins for coating include one or more resins selected from polyester resin, polycarbonate resin, acrylic resin, polystyrene resin, polyamide resin, vinyl chloride resin, olefin resin, fluorine resin, polyvinyl acetate resin, polyurethane resin, acrylonitrile butadiene styrene resin, polyvinyl acetal resin, acrylonitrile-styrene copolymer resin, ethylene-vinyl acetate copolymer resin, phenol resin, epoxy resin, melamine resin, urea resin, unsaturated polyester resin, alkyd resin, polyimide resin, and silicone resin. It should be noted that both thermoplastic polyurethane and thermosetting polyurethane can be used as the above polyurethane resin.

Furthermore, as a coating resin, photocurable resins can also be suitably used. The photocurable resins are cured by irradiation of ultraviolet light, visible light, or infrared light, as already described.

Among them, a coating resin which is capable of being applied to a mini-emulsion polymerization method is preferably used, for example, the resin containing polystyrene resin is more preferably used.

The organic-inorganic hybrid infrared absorbing particles as described above include an organic material, which is a coating resin, on at least part of the surface of the infrared absorbing particles, which was previously difficult to achieve. Therefore, even when exposed to a chemical environment such as a high temperature acid or alkali, the infrared absorbing particles can be prevented from coming into direct contact with the chemical components such as acid or alkali, thus providing excellent chemical-resistance and preventing the deterioration of infrared absorption properties. The anti-counterfeit ink composition using the organic-inorganic hybrid infrared absorbing particles can then also have chemical-resistant properties. Next, the dispersants and surfactants that are components other than the organic-inorganic hybrid infrared absorbing particles contained in the anti-counterfeit ink composition will be described.

3. Dispersant and Surfactant

The anti-counterfeit ink composition of the present embodiment can contain a dispersant or a surfactant, or both. The dispersant and the surfactant are not particularly limited to those that can disperse the organic-inorganic hybrid infrared absorbing particles already described in the anti-counterfeit ink composition. When the anti-counterfeit ink composition of the present embodiment contains the dispersant, the dispersant includes, for example, a copolymer having an amine functional group and a polyether structure. Copolymers having an amine functional group and a polyether structure include, for example, Solsperse (registered trademark) 20000, manufactured by Nippon Lubrizol, Disperbyk (registered trademark)-161, 162, 163, 182, 184, 185, manufactured by Nippon Big Chemie, Disparon (registered trademark) DA-234, DA-325, and the like, manufactured by Kusumoto Chemical Co. Ltd. When the anti-counterfeit ink composition contains a surfactant, for example, dodecyltrimethylammonium chloride can be used as the surfactant.

The anti-counterfeit ink composition of the present embodiment can also contain optional components. The anti-counterfeit ink composition may also contain, for example, a solvent and the like as described below.

4. Solvent

The anti-counterfeit ink composition of the present embodiment can also contain a solvent.

Solvents are not particularly limited. One or more solvents selected from water, alcohols such as ethanol, ketones such as methyl ethyl ketone, ester solvents such as 3-methyl-methoxy-propionate, glycol derivatives such as glycol derivatives such as propylene glycol monomethyl ether acetate, aromatic hydrocarbons such as toluene and xylene, amides such as formamide, chlorinated compounds such as chlorobenzene, vegetable oils and compounds derived from vegetable oils, and petroleum solvents can be used.

Examples of vegetable oils include dry oils such as linseed oil, sunflower oil, *paulownia* oil, and the like; semi-dry oils such as sesame oil, cottonseed oil, rapeseed oil, soybean oil, rice bran oil, and the like; and non-dry oils such as olive oil, coconut oil, palm oil, dehydrated castor oil, and the like.

Compounds derived from vegetable oils include fatty acid monoesters and ethers, which are direct ester reactions of fatty acids of vegetable oils with monoalcohols.

Examples of petroleum solvents include Isopar E Exxsol Hexane, Exxsol Heptane, Exxsol E, Exxsol D30, Exxsol D40, Exxsol D60, Exxsol D80, Exxsol D95, Exxsol D110, and Exxsol D130 with a high aniline point (manufactured by Exxon Mobil).

When a solvent is added, the solvent can be selected according to the properties required of the anti-counterfeit ink composition or the anti-counterfeit ink containing the anti-counterfeit ink composition, and the purpose of use, and is not particularly limited.

When the anti-counterfeit ink composition of the present embodiment contains a solvent, the specific method of dispersing the organic-inorganic hybrid infrared absorbing particles and either the dispersant or the surfactant, or both in the solvent, is not particularly limited. For example, to prepare the anti-counterfeit inks described below, ultrasonic waves and media stirring mills can be used, as well as when dispersing the anti-counterfeit ink composition into the liquified uncured material of the resin to be cured by energy rays. Specifically, for example, equipment such as bead mills, ball mills, sand mills, paint shakers, and ultrasonic homogenizers can be used. When dispersing the organic-inorganic hybrid infrared absorbing particles and either the dispersant or the surfactant, or the both in a solvent, it is preferable to select the dispersing conditions so as not to peel off the organic material arranged on the surface of the infrared absorbing particles.

5. Other Additive Components

The anti-counterfeit ink composition of the present embodiment may further contain optional additive components as necessary.

For example, one or more types selected from coloring pigments, dyes, and the like can be used.

[Anti-Counterfeit Ink]

The anti-counterfeit ink of the present embodiment can include the anti-counterfeit ink composition as described above and the liquified uncured material of the resin to be cured by energy rays.

The liquified uncured material of a resin to be cured by energy rays is not particularly limited, but for example, the uncured material of a resin to be cured by irradiation of ultraviolet, visible, or infrared light can be used.

The method of dispersing organic-inorganic hybrid infrared absorbing particles and either the dispersant or the surfactant, or both into the liquified uncured material of the resin to be cured by energy rays, is not particularly limited. The use of ultrasonic waves or a media stirring mill as a method to disperse the organic-inorganic hybrid infrared absorbing particles and either the dispersant or the surfactant, or both, is particularly desirable because the method can uniformly disperse the mixture.

The method of obtaining the anti-counterfeit ink composition by dispersing the organic-inorganic hybrid infrared absorbing particles into the liquified uncured material of a resin to be cured by energy rays is not particularly limited. For example, it is preferable to use a method that enables uniform dispersion of the particles in the liquified uncured material of the resin to be cured by the energy ray without causing agglomeration. For example, a dispersion processing method using a device such as a bead mill, ball mill, sand mill, paint shaker, or ultrasonic homogenizer can be used as the dispersion processing method.

As mentioned above, it can also be dispersed in a media stirring mill such as a bead mill, ball mill, sand mill, or paint shaker using media (beads, balls, Ottawa sand). However, the dispersion processing using a media stirring mill may result in the dispersion of the organic-inorganic hybrid infrared absorbing particles into the liquified uncured material of the resin to be cured by energy rays, and at the same time, the particles may also become particulate due to collisions between the organic-inorganic hybrid infrared absorbing particles and collisions of the media with the particles. Therefore, it is preferable to select the stirring conditions so as not to peel off the organic material arranged on the surface of the infrared absorbing particles due to excessive particulation. When the dispersion processing is carried out using a media stirring mill, for example, it is preferable to reduce the diameter of the media and to keep the time of the milling and dispersion processing extremely short.

The anti-counterfeit ink of the present embodiment can also contain additional optional components as needed. For example, the anti-counterfeit ink of the present embodiment may further contain an organic binder or the like. The inclusion of an organic binder can particularly inhibit the printed portion from peeling off or the organic-inorganic hybrid infrared absorbing particles from falling off when the anti-counterfeit ink of the present embodiment is applied and printed to form a printed portion on the substrate to be printed. As the organic binder, for example, one or more types selected from polyvinyl butyral, polyvinyl formyl, and the like can be suitably used.

According to the anti-counterfeit ink of the present embodiment, the anti-counterfeit ink contains the organic-inorganic hybrid infrared absorbing particles as described above. As mentioned above, the organic-inorganic hybrid infrared absorbing particles have excellent chemical-resistance and can prevent the degradation of infrared absorption properties even when exposed to chemical environments such as high temperature acid or alkali, because the infrared absorbing particles are prevented from coming into direct contact with chemical components such as acid or alkali. Therefore, the anti-counterfeit ink of the present embodiment containing the organic-inorganic hybrid infrared absorbing particles can be provided with chemical-resistant properties.

[Anti-Counterfeit Printed Product]

The anti-counterfeit printed product of the present embodiment can be equipped with a printed portion that contains the anti-counterfeit ink composition as described above.

The printed portion of the anti-counterfeit printed product of the present embodiment can be obtained, for example, by applying or printing the anti-counterfeit ink composition as described above, or the anti-counterfeit ink as described above, on the surface of the substrate to be printed in the usual manner. The anti-counterfeit ink composition or anti-counterfeit ink can be printed on the substrate to be printed, for example, in the form of a film, in this case, the printed area can also be referred to as a printed film.

The method of forming the anti-counterfeit printed product of the present embodiment, that is, the method of applying or printing the anti-counterfeit ink composition as described above or the anti-counterfeit ink as described above on the surface of the substrate to be printed, is not particularly limited. For example, one or more printing methods selected from offset printing, letterpress printing, flexographic printing, letterpress printing (resin letterpress printing), intaglio printing, screen printing, inkjet printing, and the like can be used as the printing method for the anti-counterfeit ink composition or the anti-counterfeit ink as described above.

The printed portion of an anti-counterfeit printed product can be formed by, for example, removing the solvent from a previously described anti-counterfeit ink composition or anti-counterfeit ink that has been applied, for example, by evaporation and the like to solidify solid components such as organic-inorganic hybrid infrared absorbing particles on the surface of the substrate to be printed.

The printed portion can also be formed by curing the liquified uncured material of the resin to be cured by energy rays and adhering it to the substrate to be printed, which is contained by the already described anti-counterfeit ink that has been applied. The anti-counterfeit ink contains the anti-counterfeit ink composition as described above and a liquified uncured material of resin to be cured by energy rays. Therefore, after the anti-counterfeit ink is applied and printed, it can be dried as necessary to reduce or remove the solvent, and then the resin can be cured by irradiating it with energy rays.

As previously mentioned, the anti-counterfeit ink can also contain an organic binder. In this case, the printed portion of the anti-counterfeit printed product can also contain the organic binder. If the anti-counterfeit ink contains the organic binder, it is preferable to cure the organic binder after applying or printing the anti-counterfeit ink, depending on the type of organic binder.

If the anti-counterfeit ink does not contain a binder, such as an organic binder, the printed area can be obtained by applying or printing the anti-counterfeit ink on the substrate to be printed as described above, evaporating the solvent, and in some cases even by curing the liquified uncured material of the resin to be cured by energy rays. If necessary, a cover layer made of transparent resin can be provided over the printed area to prevent peeling of the printed area and dropping of particles.

The content of infrared absorbing particles in the printed portion of an anti-counterfeit printed product can be changed according to the intended use, but usually 0.05 $g/m^2$ or more is preferably used. If the content is 0.05 $g/m^2$ or more, remarkable absorption in the near-infrared region appears. As a result, the printed product is exerted particularly well as an anti-counterfeit printed product. The upper limit of the content is not particularly limited, but 4 $g/m^2$ or less is preferably used from the viewpoint of maintaining transparency because such content does not significantly absorb light in the visible light range. The content of the above-mentioned infrared-absorbing particles can be evaluated in terms of the amount per 1 $m^2$ of printed area, because all fillers act equally on the light incident on the printing surface.

The substrate material to be printed for printing the anti-counterfeit ink composition and anti-counterfeit ink can be anything suitable for the intended use. For example, a mixture of resin and pulp, resin film, and the like can be used in addition to papers. It is also possible to print the aforementioned anti-counterfeit ink on a seal and affix the seal to the substrate to be printed.

The anti-counterfeit printed product of the present embodiment may include portions printed with various inks used in an ordinary printed product, in addition to the printed portions containing the anti-counterfeit ink composition as described above.

The anti-counterfeit printed product prepared in the present embodiment cannot be reproduced by copying or the like, and the authenticity of the printed product can be determined mechanically and reliably by irradiating infrared rays and detecting their reflection or transmission, instead of by visual judgment. Moreover, organic-inorganic hybrid infrared absorbing particles are used as the infrared absorbing material and applied to the substrate to be printed by the printing method. Therefore, the present invention is capable of providing anti-counterfeit printed products at low cost with excellent weatherability, light resistance, and chemical-resistance.

[Near-Infrared Absorption Effect of Anti-Counterfeit Printed Products]

When the anti-counterfeit ink composition and anti-counterfeit printed products using anti-counterfeit inks as described above have a transparent substrate material of the anti-counterfeit printed product, in terms of light transmittance, a maximum value appears in the wavelength range of 350 nm or more and 600 nm or less, and a minimum value appears in the wavelength range of 800 nm or more and 2100 nm or less. When the maximum value and minimum value of transmittance are expressed as a percentage, an excellent characteristic is exerted with maximum value (%)−minimum value (%)≥69 (points), that is, the difference between the maximum and minimum transmittance value is 69 points or more in percentage.

A large difference of 69 points or more between the maximum and minimum transmittance values in the anti-counterfeit printed product with a transparent substrate indicates that the anti-counterfeit printed product has an excellent near-infrared absorption effect.

[Chemical-Resistant Properties of Anti-Counterfeit Printed Product]

The aforementioned anti-counterfeit ink composition and anti-counterfeit printed product using the anti-counterfeit ink have excellent chemical-resistant properties. For example, even after immersion in a 0.01 mol/L sodium hydroxide solution maintained at 80° C. for 30 minutes, the difference between the maximum and minimum transmittance values as described above is maintained at 69 points or more.

EXAMPLES

The present invention is described in detail with reference to the following examples. However, the present invention is not limited to the following examples.

The optical properties of the printed portions of the anti-counterfeit printed products obtained in Examples and Comparative Examples were measured using a spectrophotometer U-4100 (manufactured by Hitachi, Ltd.). The visible light transmittance was measured in accordance with JIS R 3106.

For the measurement of crystallite size of infrared absorbing particles, dry powder of infrared absorbing particles obtained by removing the solvent from the dispersion of the infrared absorbing particles was used. The X-ray diffraction patterns of the infrared absorbing particles were measured by a powder X-ray diffraction method (θ-2θ method) using a powder X-ray diffractometer (X'Pert-PRO/MPD manufactured by PANalytical, Spectris Corporation). The crystal structure contained in the infrared absorbing particles was identified from the obtained X-ray diffraction pattern, and the crystallite size was calculated using the Rietveld method.

Example 1

An anti-counterfeit ink composition, an anti-counterfeit ink, and an anti-counterfeit printed product were produced and evaluated according to the following procedures.

1. Production of Organic-Inorganic Hybrid Infrared Absorbing Particles

Organic-inorganic hybrid infrared absorbing particles used in the anti-counterfeit ink composition were manufactured according to the following process.

(Step of Preparing Dispersion Solution)

In the step of preparing a dispersion solution, a dispersion solution containing infrared absorbing particles, a dispersant, and a dispersion medium was prepared.

As infrared absorbing particles, composite tungsten oxide powder containing hexagonal cesium tungsten bronze ($Cs_{0.33}WO_z$, $2.0 \leq z \leq 3.0$), where the ratio of the amount of material of cesium (Cs) and tungsten (W) is Cs/W=0.33 (YM-01, manufactured by Sumitomo Metal Mining Co., Ltd.) was prepared.

As a dispersant, a polymeric dispersant that is a copolymer of styrene and 2-(dimethylamino) ethyl methacrylate was prepared.

Toluene was also prepared as a dispersion medium.

The mixture obtained by mixing 10% by mass of the infrared absorbing particles, 3% by mass of the dispersant, and 87% by mass of the dispersion medium was loaded into a paint shaker containing 0.3 mmφ $ZrO_2$ beads and pulverized and dispersed for 10 hours to obtain a dispersion solution of $Cs_{0.33}WO_z$ particles in Example 1.

(Step of Reducing Dispersion Solution)

The dispersion medium such as toluene was removed from the dispersion solution of $Cs_{0.33}WO_z$ particles obtained in the step of preparing the dispersion solution using an evaporator, and the infrared absorbing particles were recovered. The recovered infrared absorbing particles are the dry powder of $Cs_{0.33}WO_z$ particles containing polymer dispersant.

The crystallite size of the recovered infrared absorbing particles, that is, $Cs_{0.33}WO_z$ particles, was 16 nm.

The crystallite size was measured and calculated by the conventional method.

(Step of Preparing Raw Material Mixture)

The organic phase was formed by mixing 0.05 g of the infrared absorbing particles obtained in the step of reducing the dispersion medium, 1.0 g of styrene as a resin raw material for coating, 0.065 g of hexadecane as an organic solvent, and 0.0079 g of 2,2'-azobisisobutyronitrile as a polymerization initiator. The polymerization initiator was added to prepare 0.5% by mol of styrene.

In addition, apart from the above organic phase, 10 g of aqueous phase was prepared by mixing dodecyltrimethylammonium chloride as an emulsifier and water. When forming the aqueous phase, dodecyltrimethylammonium chloride as the emulsifier was added to water to achieve 1.5 times of concentration of the critical micelle concentration.

The raw material mixture was then prepared by adding the organic phase to the aqueous phase.

(Stirring Step)

The raw material mixture prepared in the step of preparing a raw material mixture was irradiated with high-power ultrasonic waves for 15 minutes while being cooled under an ice bath to obtain a mini-emulsion.

(Polymerization Step)

After the stirring step, the raw material mixture was deoxygenated by nitrogen bubbling under an ice bath for 15 minutes.

Then, the polymerization reaction of styrene was proceeded by heat treatment at 70° C. for 6 hours under a nitrogen atmosphere to obtain organic-inorganic hybrid infrared absorbing particle dispersion.

Figure 2:
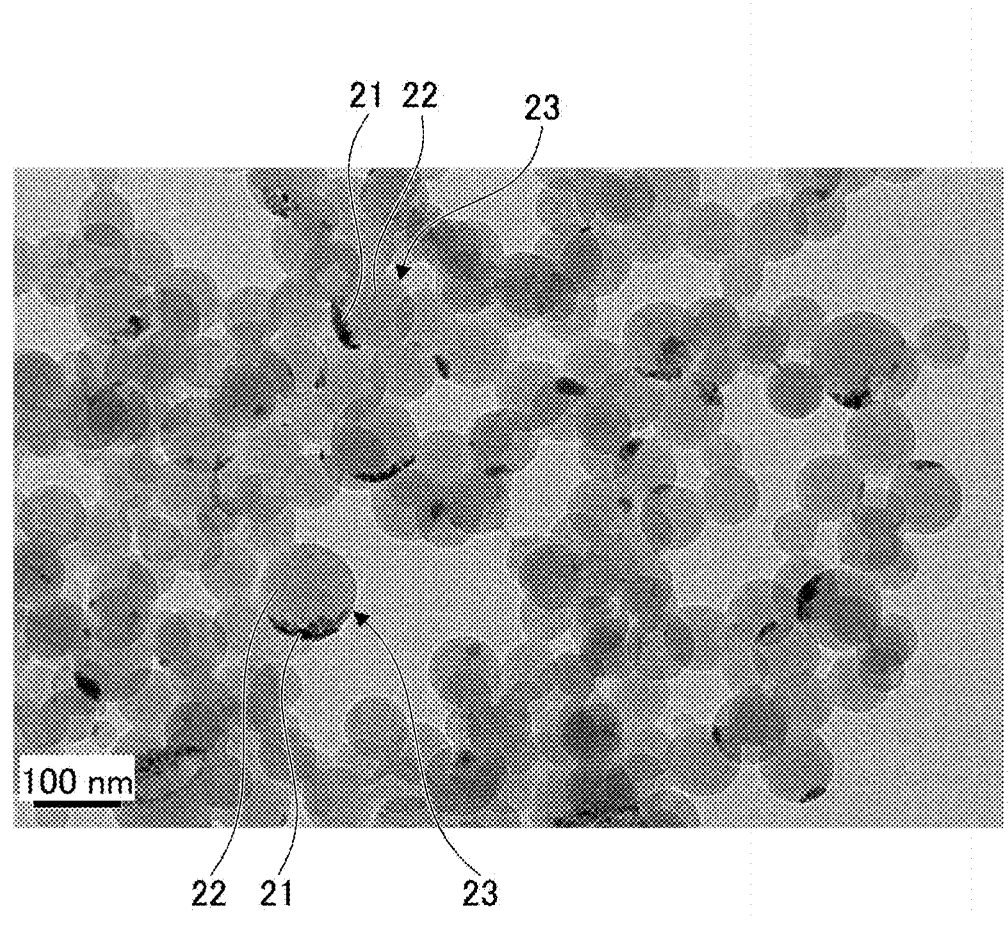
FIG. 2 illustrates a transmission electron micrograph of organic-inorganic hybrid infrared absorbing particles obtained in Example 1.

The obtained dispersion solution containing the organic-inorganic hybrid infrared absorbing particles was diluted and transferred to a microgrid for TEM observation, and TEM observation of the transferred material was performed. The TEM image is shown in FIG. 2. From the TEM image, it was confirmed that the infrared absorbing particles 21 containing the composite tungsten oxide which was appeared black was embedded in the coating film which is the coating resin 22 of the polystyrene which was appeared gray, and formed organic-inorganic hybrid infrared-absorbing particles 23.

2. Production of Anti-Counterfeit Ink Composition

The solvent was removed from the obtained organic-inorganic hybrid infrared absorbing particles dispersion solution by vacuum fluidized dryer to obtain the organic-inorganic hybrid infrared absorbing particles dry powder in Example 1. 10 parts by mass of the resulting dry powder, 10 parts by mass of a copolymer having an amine functional group and a polyether structure as the polymer dispersant, and 80 parts by mass of propylene glycol monomethyl ether acetate as an organic solvent were weighed. These raw materials were cooled under an ice bath and irradiated with high power ultrasound for 15 minutes to disperse the organic-inorganic hybrid infrared absorbing particles in an organic solvent to obtain the anti-counterfeit ink composition in Example 1.

3. Production of Anti-Counterfeit Ink 100 g of the anti-counterfeit ink composition of Example 1 was mixed with 20 g of UV-curable resin UV3701 (manufactured by Toagosei Co., Ltd.), which is a liquified uncured form of resin to be cured by energy rays.

4. Production of Anti-Counterfeit Printed Product

A transparent PET film with a thickness of 50 μm was used as a substrate for printing, and anti-counterfeit ink was deposited on its surface by a bar coater. The film was dried at 70° C. for 1 minute to evaporate the solvent, and then irradiated with ultraviolet rays using a high-pressure mercury lamp to cure the ultraviolet curing resin to obtain an anti-counterfeit printed product containing a printed film (printed portion) in Example 1.

(Evaluation of Anti-Counterfeit Printed Product)

The optical properties of the printed film of the anti-counterfeit printed product were measured by the method described above. Specifically, the visible light transmittance was measured using the method described above.

When the visible light transmittance was determined, it was confirmed that a maximum value was observed in the wavelength range of 350 nm or more and 600 nm or less, and a minimum value was observed in the wavelength range of 800 nm or more and 2100 nm or less. Therefore, the value of the difference between the maximum transmittance value in the wavelength range of 350 nm to 600 nm and the minimum transmittance value in the wavelength range of 800 nm to 2100 nm was determined as a point, and the transmittance values at wavelengths of 500 nm, 1000 nm, and 1500 nm were also determined.

The visible light transmittance was 70.2%, the difference between the maximum and minimum transmittance value was 71.8 points, the transmittance at 500 nm wavelength was 72.1%, the transmittance at 1000 nm was 4.8%, and the transmittance at 1500 nm was 2.2%.

Next, the printed film was immersed in a 0.01 mol/L of sodium hydroxide solution maintained at 80° C. for 30 minutes to perform an alkali resistance test. Subsequently, the optical properties were measured again.

The visible light transmittance after the alkali resistance test was 71.5%, the difference between the maximum and minimum transmittance values was 71.0 points, the transmittance at 500 nm wavelength was 73.2%, the transmittance at 1000 nm was 5.0%, and the transmittance at 1500 nm was 2.3%. The evaluation results are indicated in Table 1.

In other words, it was confirmed that there was no significant change in the light transmittance of the printed film of the anti-counterfeit printed product before and after the alkali resistance test. Therefore, it was confirmed that the anti-counterfeit ink composition, the anti-counterfeit ink, and the anti-counterfeit printed product containing the anti-counterfeit ink composition obtained in this example have chemical-resistant properties, especially alkali resistance.

Example 2

10.0 parts by mass of the organic-inorganic hybrid infrared absorbing particle dry powder in Example 1, 0.1 parts by mass of dodecyltrimethylammonium chloride as a surfactant, and 89.9 parts by mass of pure water were weighed. These raw materials were cooled under an ice bath and irradiated with high power ultrasound for 15 minutes to disperse the organic-inorganic hybrid infrared absorbing particles in pure water to obtain the anti-counterfeit ink composition in Example 2.

100 g of the anti-counterfeit ink composition of Example 2 was mixed with 20 g of the UV-curing resin OXT-101 (manufactured by Toagosei Co., Ltd.), which is a liquified uncured product of a resin to be cured by energy rays.

A transparent PET film with a thickness of 50 μm was used as the substrate to be printed, and the anti-counterfeit ink was deposited on its surface using a bar coater. The film was dried at 100° C. for 2 minutes to evaporate the solvent, and then irradiated with ultraviolet rays using a high-pressure mercury lamp to cure the ultraviolet curing resin to obtain the anti-counterfeit printed product in Example 2.

The anti-counterfeit printed product of Example 2 was evaluated in the same manner as in Example 1. The evaluation results are indicated in Table 1.

Comparative Example 1

In the step of preparing a dispersion solution, a dispersion solution containing infrared absorbing particles and a dispersion medium was prepared.

As infrared absorbing particles, composite tungsten oxide powder containing hexagonal cesium tungsten bronze ($Cs_{0.33}WO_z$, $2.0 \leq z \leq 3.0$), where the ratio of the amount of material of cesium (Cs) and tungsten (W) is Cs/W=0.33 (YM-01, manufactured by Sumitomo Metal Mining Co., Ltd.) was prepared.

As a dispersion medium, pure water was prepared.

The mixture obtained by mixing 10% by mass of the infrared absorbing particles with 90% by mass of the dispersion medium was loaded into a paint shaker containing 0.3 mmφ $ZrO_2$ beads and pulverized and dispersed for 10 hours to obtain a dispersion solution of $Cs_{0.33}WO_z$ particles in Comparative Example 1.

The dispersion medium such as pure water was removed from the dispersion solution of $Cs_{0.33}WO_z$ particles obtained in the step of preparing the dispersion solution using an evaporator, and the infrared absorbing particles were recovered. The recovered infrared absorbing particles are the dry powder of $Cs_{0.33}WO_z$ particles.

The crystallite size of the recovered infrared absorbing particles, that is, $Cs_{0.33}WO_z$ particles, was 16 nm.

The crystallite size was measured and calculated by the conventional method.

The anti-counterfeit ink composition, anti-counterfeit ink, and anti-counterfeit printed product in Comparative Example 1 were obtained in the same manner as in Example 1, except that a dispersion of $Cs_{0.33}WO_z$ particles in Comparative Example 1 was prepared in the step of preparing the dispersion solution of the above instead of using the dispersion solution of organic-inorganic hybrid infrared absorbing particles of Example 1. The resulting anti-counterfeit printed product was evaluated in the same manner as in Example 1. The evaluation results are indicated in Table 1.

TABLE 1

| | Before alkali resistance test | | | | | After alkali resistance test | | | | |
|---|---|---|---|---|---|---|---|---|---|---|
| | Visible light transmittance [%] | Difference between the maximum and minimum transmittance values [Point] | Transmittance 500 nm [%] | Transmittance 1000 nm [%] | Transmittance 1500 nm [%] | Visible light transmittance [%] | Difference between the maximum and minimum transmittance values [Point] | Transmittance 500 nm [%] | Transmittance 1000 nm [%] | Transmittance 1500 nm [%] |
| Example 1 | 70.2 | 71.8 | 72.1 | 4.8 | 2.2 | 71.5 | 71.0 | 73.2 | 5.0 | 2.3 |
| Example 2 | 70.5 | 71.7 | 72.5 | 4.9 | 2.3 | 71.7 | 71.1 | 73.5 | 5.2 | 2.5 |
| Comparative Example 1 | 70.3 | 71.9 | 72.2 | 4.8 | 2.2 | 89.2 | 3.9 | 90.9 | 87.2 | 88.8 |

From the results of the evaluation of the optical characteristics of the anti-counterfeit printed product before and after the alkali resistance test indicated in Table 1 above, it was confirmed that the anti-counterfeit printed product using the organic-inorganic hybrid infrared absorbing particles of Examples 1 and 2, in which a coating resin is placed on at least a part of the surface of the infrared absorbing particles, did not show any significant change in the light absorption and transmission characteristics before and after the test. Therefore, it was confirmed that the anti-counterfeit printed products using the organic-inorganic hybrid infrared absorbing particles of Examples 1 and 2 have excellent alkali resistance, that is, chemical-resistant properties, and excellent infrared absorption properties. Although only the alkali resistance test was conducted here, these organic-inorganic hybrid infrared absorbing particles also have acid resistance properties as well, because the coating resin is placed on at least part of the surface of the infrared absorbing particles.

On the other hand, in the anti-counterfeit printed product using the infrared absorbing particles of Comparative Example 1, the infrared absorbing property disappeared after the alkali resistance test, and it was confirmed that the printed product did not have alkali resistance.

The anti-counterfeit ink composition, anti-counterfeit ink, and anti-counterfeit printed product have been described above in the form of embodiments, examples, and the like. However, the present invention is not limited to the above embodiments, and examples and the like. Various variations and changes are possible within the scope of the present invention as described in the claims.

The present application is based on and claims priority to Japanese Patent Application No. 2019-105630 filed on Jun. 5, 2019 with the Japan Patent Office, and the entire contents of Japanese Patent Application No. 2019-105630 are hereby incorporated by reference.

The invention claimed is:

1. An anti-counterfeit ink composition comprising:

organic-inorganic hybrid infrared absorbing particles; and a surfactant, wherein the organic-inorganic hybrid infrared absorbing particles include infrared absorbing particles and a coating resin, the organic-inorganic hybrid infrared absorbing particles are obtained by polymerizing a mini-emulsion containing a raw material of the coating resin and the infrared absorbing particles; whereby each of the organic-inorganic hybrid infrared absorbing particles forms a spherical structure having a size of 50 nm or more and 500 nm or less, in which the infrared absorbing particles are encapsulated, the coating resin includes one or more resins selected from polyester resin, polycarbonate resin, acrylic resin, polystyrene resin, polyamide resin, vinyl chloride resin, olefin resin, fluorine resin, polyvinyl acetate resin, polyurethane resin, acrylonitrile butadiene styrene resin, polyvinyl acetal resin, acrylonitrile-styrene copolymer resin, ethylene-vinyl acetate copolymer resin, phenol resin, epoxy resin, melamine resin, urea resin, unsaturated polyester resin, alkyd resin, and polyimide resin, and the surfactant is an aqueous solution in which dodecyltrimethylammonium chloride is present in water at a concentration of 1 to 10 times the critical micelle concentration.

2. The anti-counterfeit ink composition according to claim 1, wherein the coating resin is a photocurable resin, and wherein the photocurable resin includes a resin to be cured by irradiation of any one of ultraviolet rays, visible rays, or infrared rays.

3. The anti-counterfeit ink composition according to claim 1, wherein the infrared absorbing particles include one or more of a tungsten oxide represented by a general formula $W_yO_z$ (W: tungsten, O: oxygen, $2.2 \leq z/y \leq 2.999$) and a composite tungsten oxide represented by a general formula $M_xW_yO_z$ (an element M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, $0.001 \leq x/y \leq 1$, $2.0 \leq z/y \leq 3.0$).

4. The anti-counterfeit ink composition according to claim 1, further comprising a dispersant.

5. The anti-counterfeit ink composition according to claim 4, wherein the dispersant includes a copolymer having an amine functional group and a polyether structure.

6. An anti-counterfeit ink including the anti-counterfeit ink composition of claim 1, and a liquified uncured material of a resin to be cured by energy rays.

7. An anti-counterfeit printed product including a printed portion containing the anti-counterfeit ink composition of claim 1.

8. The anti-counterfeit printed product according to claim 7, wherein the printed portion includes an organic binder.

* * * * *